United States Patent
Han

(10) Patent No.: US 11,246,464 B2
(45) Date of Patent: Feb. 15, 2022

(54) ROBOT CLEANER AND METHOD FOR CONTROLLING THEREOF

(71) Applicant: Samsung Electronics Co., Ltd., Suwon-si (KR)

(72) Inventor: Seong-joo Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/860,365

(22) Filed: Jan. 2, 2018

(65) Prior Publication Data
US 2018/0184868 A1 Jul. 5, 2018

(30) Foreign Application Priority Data

Jan. 3, 2017 (KR) .................. 10-2017-0000760

(51) Int. Cl.
*A47L 9/28* (2006.01)

(52) U.S. Cl.
CPC .......... *A47L 9/2873* (2013.01); *A47L 9/2805* (2013.01); *A47L 9/2842* (2013.01); *A47L 9/2852* (2013.01); *A47L 9/2884* (2013.01); *A47L 2201/022* (2013.01); *A47L 2201/04* (2013.01); *A47L 2201/06* (2013.01); *B60L 2200/40* (2013.01); *B60L 2240/80* (2013.01)

(58) Field of Classification Search
CPC .... A47L 9/2873; A47L 9/2852; A47L 9/2884; A47L 9/2842; A47L 9/2805; A47L 2201/022; A47L 2201/04; A47L 2201/06; B60L 58/13; B60L 53/00; B60L 2240/80; B60L 2200/40
See application file for complete search history.

(56) References Cited

U.S. PATENT DOCUMENTS

| | | | |
|---|---|---|---|
| 5,440,216 A | 8/1995 | Kim | |
| 5,646,494 A | 7/1997 | Han | |
| 5,995,884 A * | 11/1999 | Allen | G05D 1/0225 701/24 |
| 6,748,297 B2 * | 6/2004 | Song | A47L 9/2805 15/319 |
| 7,166,983 B2 | 4/2007 | Jung | |
| 8,010,229 B2 | 8/2011 | Kim et al. | |
| 9,215,957 B2 * | 12/2015 | Cohen | A47L 9/2857 |

(Continued)

FOREIGN PATENT DOCUMENTS

| | | |
|---|---|---|
| EP | 2583610 A2 | 4/2013 |
| JP | 2846835 B2 | 1/1999 |

(Continued)

OTHER PUBLICATIONS

International Search Report dated Mar. 29, 2018 in connection with International Patent Application No. PCT/KR2018/000042.

(Continued)

*Primary Examiner* — Duy Vu N Deo
*Assistant Examiner* — Christopher Remavege

(57) ABSTRACT

A robot cleaner is provided. The robot cleaner includes a battery, and a processor configured to, in response to the battery being consumed in accordance with a cleaning operation for the cleaning area and a remaining capacity of the battery reaching a predetermined value, control the robot cleaner to charge some of the battery and clean a remaining area using the charged battery.

14 Claims, 8 Drawing Sheets

(56) References Cited

U.S. PATENT DOCUMENTS

| | | | |
|---|---|---|---|
| 9,685,810 B1* | 6/2017 | Bhardwaj | H02J 7/00 |
| 10,579,064 B2* | 3/2020 | Sussman | H02J 7/0071 |
| 2005/0132522 A1 | 6/2005 | Im et al. | |
| 2005/0242777 A1* | 11/2005 | Van Beek | B60L 58/13 |
| | | | 320/128 |
| 2006/0087273 A1* | 4/2006 | Ko | A47L 9/009 |
| | | | 318/568.12 |
| 2008/0133054 A1* | 6/2008 | Kim | A47L 9/2805 |
| | | | 700/245 |
| 2011/0050163 A1* | 3/2011 | Xiao | H02J 7/0072 |
| | | | 320/107 |
| 2014/0184172 A1* | 7/2014 | Momo | H02J 7/00 |
| | | | 320/160 |
| 2014/0347003 A1* | 11/2014 | Sporck | H02J 7/0052 |
| | | | 320/107 |
| 2015/0202772 A1* | 7/2015 | Kim | B25J 9/16 |
| | | | 700/245 |
| 2015/0326037 A1* | 11/2015 | Borhan | B60L 58/16 |
| | | | 320/162 |
| 2016/0075021 A1* | 3/2016 | Cohen | G01S 1/7034 |
| | | | 700/253 |
| 2016/0095488 A1 | 4/2016 | Lee et al. | |
| 2020/0019178 A1* | 1/2020 | Orzechowski | A47L 9/2884 |

FOREIGN PATENT DOCUMENTS

| | | |
|---|---|---|
| JP | 3006986 B2 | 2/2000 |
| JP | 2006020830 A | 1/2006 |
| KR | 10-2005-0110128 A | 11/2005 |
| KR | 10-0619753 B1 | 9/2006 |
| KR | 10-0696134 B1 | 3/2007 |
| KR | 10-2008-0040369 A | 5/2008 |
| KR | 10-2008-0052127 A | 6/2008 |
| KR | 10-0841027 B1 | 6/2008 |
| KR | 10-2009-0053263 A | 5/2009 |
| KR | 10-2009-0115526 A | 11/2009 |
| KR | 10-1403954 B1 | 6/2014 |
| KR | 10-2016-0082619 A | 7/2016 |
| WO | 2016/114024 A1 | 7/2016 |

OTHER PUBLICATIONS

Written Opinion of the International Searching Authority dated Mar. 29, 2018 in connection with International Patent Application No. PCT/KR2018/000042.

FVEAA Forums, "Constant Current Constant Voltage (CCCV) Charging," Simple Machines Forum, Dec. 14, 2017, http://www.fveaa.org/forums/index.php?topic=1302.0, 2 pages.

CADEX, "Motorola MC 32 Series Adapter, BU-409: Charging Lithium-ion," Charging Lithium-Ion Batteries-Battery University, Dec. 15, 2017, http://batteryuniversity.com/learn/article/charging_lithium_ion_batteries, 76 pages.

Supplementary European Search Report dated Jul. 4, 2019 in connection with European Patent Application No. 18 73 5945, 7 pages.

* cited by examiner (a) Prior Art (b)

ROBOT CLEANER AND METHOD FOR CONTROLLING THEREOF

CROSS-REFERENCE TO RELATED APPLICATION AND CLAIM OF PRIORITY

This application is related to and claims priority to Korean Patent Application No. 10-2017-0000760, filed on Jan. 3, 2017, the contents of which are incorporated herein by reference.

TECHNICAL FIELD

Aspects of the exemplary embodiments relate to a robot cleaner and a controlling method thereof, and more particularly, to a robot cleaner that if a remaining capacity of a battery goes lower than a predetermined level while performing a cleaning operation, may perform a cleaning operation for a remaining area after charging the battery, and a controlling method thereof.

BACKGROUND

Generally, a robot is developed for industrial use and widely used in various industrial sites. In recent years, the field in which a robot is used has been expanded, and the robot is used in a medical field, an aerospace field, and even in a general house.

The representative robot which is used in a general house is a robot cleaner. The robot cleaner autonomously drives an inner space of a house and cleans the space by sucking foreign substances such as dust.

Meanwhile, the robot cleaner generally includes a rechargeable battery and goes around an inner space itself by an automatic driving and performs a cleaning operation. As such, the robot cleaner including the rechargeable battery determines the time to charge the battery by checking a voltage level of the battery by measuring the voltage of the battery while performing a cleaning operation by an automatic driving, and if it is determined that the battery is needed to be charged, the cleaning robot returns to a charging station positioned at a specific location in the interior space and charges the battery automatically.

If it is impossible to clean the whole area only with the fully charged battery, the robot cleaner returns to the charging station, charges the battery, and then performs the cleaning operation again. Here, the robot cleaner normally charges the battery 100%, that is, the battery is fully charged.

However, there is a problem that if the battery is fully charged and then the cleaning operation for a remaining area is performed, the completion time of the cleaning becomes overly longer because the completion time of the cleaning, from the beginning to the end of the cleaning, includes the time to fully charge the battery.

SUMMARY

To address the above-discussed deficiencies, it is a primary object to provide a robot cleaner that if a remaining capacity of a battery goes lower than a predetermined level while performing a cleaning operation, may perform a cleaning operation for a remaining area after charging some of the battery, and a controlling method thereof.

According to an exemplary embodiment, there is provided a robot cleaner which cleans a cleaning area, the robot cleaner includes a battery, and a processor configured to, in response to the battery being consumed in accordance with a cleaning operation for the cleaning area and a remaining capacity of the battery reaching a predetermined value, control the robot cleaner to charge some of the battery and clean a remaining area using the charged battery.

The processor, in response to the remaining capacity of the battery becoming a preset value, may control to charge some of the battery as much as a preset capacity.

The processor, in response to the remaining capacity of the battery becoming a preset value, may control to charge some of the battery as much as a capacity determined according to at least one of a charging method of the battery and information on a cleaning area.

The battery charging method may be a Constant Current Constant Voltage (CCCV) charging method in which a preset capacity is quickly charged through a Constant current (CC) charging method, and a remaining capacity is charged through a Constant voltage (CV) charging method, and the processor, in response to the battery being charged as much as a preset capacity according to the CC charging method, may clean a remaining area using the charged battery.

The information on the cleaning area may include a cleaning map which indicates the cleaning area, and the processor, in response to a remaining capacity of the battery becoming a predetermined value, may calculate a time consumed for cleaning the remaining area where a cleaning operation is not performed in the cleaning area based on the cleaning map, calculate a battery capacity required to clean the remaining area for the determined time, charge the battery as much as the calculated capacity, and clean the remaining area using the charged battery.

The processor may determine a size and a form of the remaining area based on the cleaning map, and calculate a time consumed for cleaning the remaining area based on the size and the form.

The processor may determine a suction mode which indicates a suction intensity of the robot cleaner when a cleaning is performed, and calculate a battery capacity required to clean the remaining area for the determined time in the determined suction mode.

The processor may calculate a battery capacity required to finish the cleaning before performing a cleaning operation for the cleaning area, and in response to a current battery capacity being lower than the calculated battery capacity, control to perform the cleaning after charging the battery as much as the calculated battery capacity.

The processor, when some of the battery is changed in a charging station, may additionally charge a capacity required for returning to the charging station from a point in which a cleaning operation for the remaining area is finished.

The processor, in response to the remaining capacity of the battery becoming the preset value and it being determined that the remaining capacity exceeds a battery capacity required to clean the remaining area, may perform a cleaning operation for the remaining area without charging the battery.

A method for controlling a robot cleaner which cleans a cleaning area, the method includes in response to the battery being consumed in accordance with a cleaning operation for the cleaning area and a remaining capacity of the battery reaching a predetermined value, charging some of the battery, and cleaning a remaining area using the charged battery.

The charging the battery may include charging some of the battery as much as a preset capacity in response to a remaining capacity of the battery becoming a preset value.

The charging the battery may include charging some of the battery as much as a capacity determined according to at least one of a charging method of the battery and information on a cleaning area, in response to the remaining capacity of the battery becoming a preset value.

The battery charging method may be a CCCV charging method in which a preset capacity is quickly charged through a CC charging method, and a remaining capacity may be charged through a CV charging method, and the cleaning the remaining area may include cleaning a remaining area using the charged battery in response to the battery being charged as much as a preset capacity according to the CC charging method.

The information on the cleaning area may include a cleaning map which indicates the cleaning area, and the charging the battery may include, in response to a remaining capacity of the battery becoming a predetermined value, calculating a time consumed for cleaning the remaining area where a cleaning operation is not performed in the cleaning area based on the cleaning map, calculating a battery capacity required to clean the remaining area for the determined time, and charging the battery as much as the calculated capacity.

The calculating a time consumed for cleaning the remaining area may include determining a size and a form of the remaining area based on the cleaning map, and calculating a time consumed for cleaning the remaining area based on the size and the form.

The calculating a battery capacity required to clean the remaining area may include determining a suction mode which indicates a suction intensity of the robot cleaner when a cleaning is performed, and calculating a battery capacity required to clean the remaining area for the predetermined time in the determined suction mode.

The method further includes calculating a battery capacity required to finish the cleaning before performing a cleaning operation for the cleaning area, and in response to a current battery capacity being lower than the calculated battery capacity, performing the cleaning after charging the battery as much as the calculated battery capacity.

The charging the battery may include additionally charging a capacity required for returning to a charging station from a point in which a cleaning operation for the remaining area is finished when some of the battery is changed in the charging station.

The charging the battery may include, in response to the remaining capacity of the battery becoming the preset value and it being determined that the remaining capacity exceeds a battery capacity required to clean the remaining area, performing a cleaning operation for the remaining area without charging the battery.

As described above, according to an exemplary embodiment, there is an effect that the completion time of a cleaning can be shortened by partially charging a battery when the battery is low while a cleaning operation is performed, and then performing the cleaning operation again.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the present disclosure and the claims are general terms selected in consideration of the functions of the various example embodiments of the present disclosure. However, such terms may be varied depending on an intention of those skilled in the art, a legal or technical interpretation, an emergence of a new technology, and the like.

Also, there may be some terms arbitrarily selected by an applicant. Such terms may be construed according to meanings defined in the present specification, and may also be construed based on general contents of the present specification and a typical technical concept in the art unless the terms are not specifically defined.

In describing example embodiments, detailed description of relevant known functions or components may be omitted if it would obscure the description of the subject matter.

Further, the following description describes exemplary embodiments in detail with reference to the attached drawings and explanations, but exemplary embodiments are not limited thereto.

Figure 1:
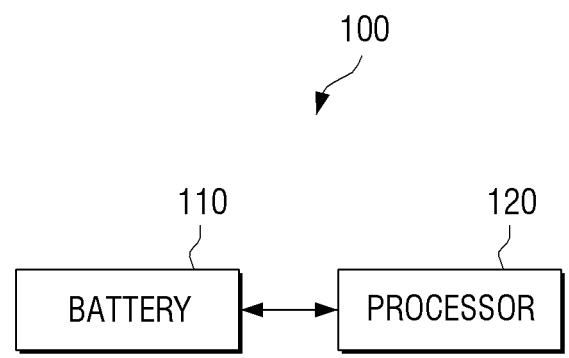
FIG. 1 is a block diagram illustrating a robot cleanser according to an exemplary embodiment.

FIG. 1 is a block diagram illustrating a robot cleanser according to an exemplary embodiment.

Referring to FIG. 1, a robot cleaner 100 may include a battery 110 and a processor 120. Here, the battery 110 may provide a power required to operate the robot cleaner 100 and the processor 120 may control each element in the robot cleaner 100 using the power provided from the battery 110.

Specifically, the processor 120 may perform a cleaning operation of the robot cleaner 100.

In this case, the processor 120 may control the robot cleaner 100 to move according to pre-stored map information, that is, a cleaning map which indicates a cleaning area, and to perform a cleaning operation when moving and stopping. In more detail, the processor 120 may control the robot cleaner 100 to move to the space to be cleaned based on the cleaning map, and to perform the cleaning operation when the robot cleaner 100 moves to the corresponding space.

If the robot cleaner 100 does not include the cleaning map, the processor 120 may control the robot cleaner 100 to move according to a predetermined algorithm and generate map information according to the moving trajectory, that is, the cleaning map. In addition, if the cleaning map is generated, the processor 120 may store the cleaning map and control the movement and the cleaning operation of the robot cleaner 100 as described above.

Meanwhile, if the algorithm which can generate the cleaning map is not set in the robot cleaner 100, the processor 120 may control the robot cleaner 100 to perform a cleaning operation and a moving operation at the same time.

Accordingly, the robot cleaner 100 may perform a cleaning operation while getting around the interior space itself by an automatic driving.

In addition, the processor 120 may determine a remaining capacity of the battery 110 included in the robot cleaner 100 which performs the cleaning operation.

Specifically, the processor 120 may determine the remaining capacity of the battery 110 by measuring a voltage of the battery 110.

In order to perform this operation, the robot cleaner 100 may further include a power unit (not illustrated) to measure the voltage of the battery 110, an A/D converter (not illustrated) which converts the measured voltage into a digital signal, and a transmitter (not illustrated) which transmits the digital signal to the processor 120.

Accordingly, if the digital signal which includes the information on the voltage of the battery 110 is received from the transmitter (not illustrated), the processor 120 may determine the voltage of the battery 110 based on the digital signal and determine the remaining capacity of the battery 110. Meanwhile, the processor 120 may determine the remaining capacity of the battery 110 at an interval of seconds or minutes, and this interval may set by a user in advance.

In addition, if the remaining capacity of the battery 110 reaches a predetermined value, the processor 120 may move the robot cleaner 100 to a charging station. Specifically, if the determined remaining capacity of the battery 110 reaches a predetermined value, the processor 120 may stop the cleaning operation of the robot cleaner 100 and move the robot cleaner 100 to the charging station.

Specifically, since the robot cleaner 100 performs a moving operation and a suction operation etc. when perform a cleaning operation, more than a certain capacity of battery is required to perform the cleaning operation. Accordingly, if the battery 110 is consumed and thus, the remaining capacity becomes a predetermined value, the processor 120 moves the robot cleaner 100 to the charging station for charging the battery 110. Here, the predetermined value may be set by a manufacturer in advance and may be set or changed by a user.

Meanwhile, the processor 120 may use a sensor (not illustrated) which receives a signal transmitted by the charging station in order to move the robot cleaner 100 to the charging station.

Specifically, if the sensor (not illustrated) receives the signal transmitted from the charging station, the processor 120 may determine the distance, direction and angle from the charging station based on the size and an angle of the received signal, and move the robot cleaner 100 to the charging station.

Meanwhile, the sensor (not illustrated) may include an Infrared Ray Sensor, an Ultra Sonic Sensor, a Radio Frequency (RF) Sensor and the like, and may be included in the robot cleaner 100 or at one side of the robot cleaner 100.

Meanwhile, it has been described that the sensor (not illustrated) moves the robot cleaner 100 to the charging station using the received signal, but the sensor may move the robot cleaner 100 to the charging station using the location information of the charging station. In this case, the location of the charging station may be pre-stored in the robot cleaner 100.

Subsequently, the processor 120 may charge some of the battery 110 as much as a predetermined capacity, or charge some of the battery 110 as much as the capacity determined according to at least one of a charging method of the battery or information on the cleaning area.

As such, the processor 120 may control the robot cleaner 100 to perform a cleaning operation for a remaining area after some of the battery 110 is charged, not after the battery is fully charged up to 100%.

Accordingly, compared to the robot cleaner in a related art which performs a cleaning operation for a remaining area after a battery is fully charged, in the case of the robot cleaner according to an exemplary embodiment, the total cleaning time from the beginning to the end of the cleaning operation can be shortened.

In the following, first, the method for performing a cleaning operation for a remaining area after the battery is charged for a predetermined capacity based on the battery charging method, will be described with reference to FIG. 2 to FIG. 4.

Figure 2:
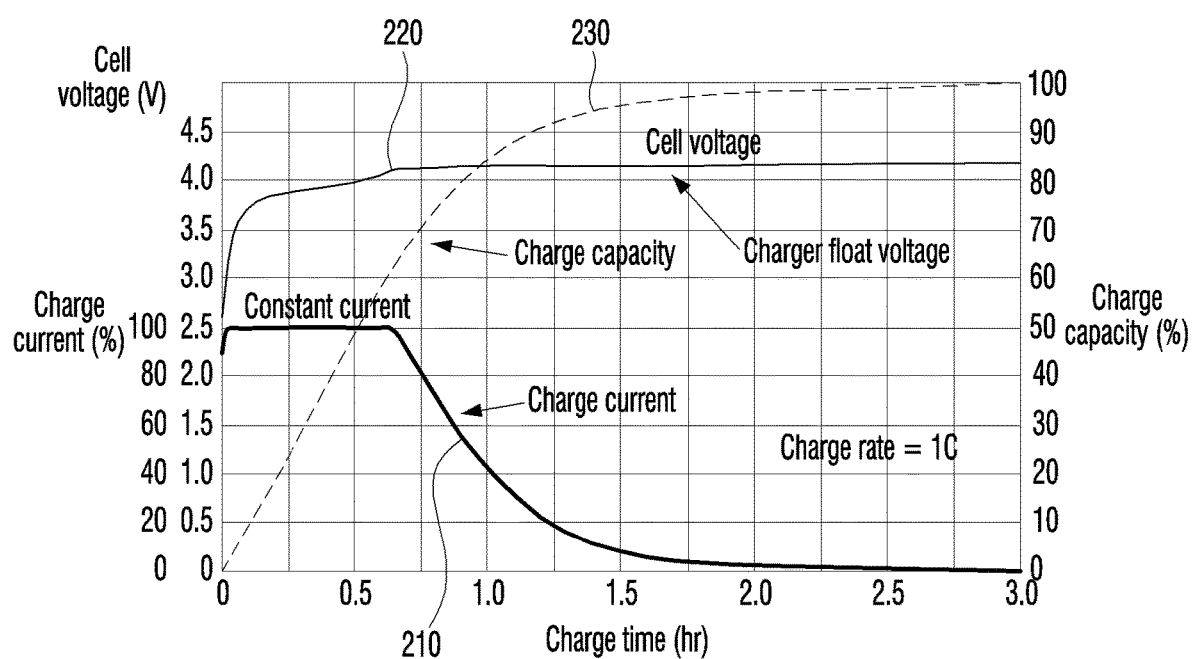
FIG. 2 is a view illustrating a battery charging method according to an exemplary embodiment.

FIG. 2 is a view illustrating a battery charging method according to an exemplary embodiment.

The battery charging method according to an exemplary embodiment may include a Constant Current Constant Voltage (CCCV) charging method. Here, the CCCV charging method refers to the method in which a predetermined capacity is quickly charged through a Constant Current (CC) charging method, and the remaining capacity is charged through a Constant Voltage (CV) charging method.

For example, as illustrated in FIG. 2, the CCCV charging method may charge the capacity 230 of the battery 110 as much as the capacity of 60% by the CC charging method 210 for 35 minutes from the beginning of the charging, and after then, charge the remaining 40% capacity by the CV charging method 220 for 2 hours 25 minutes. That is, in the CC charging stage 210, the battery 110 is charged quickly because a high current is supplied to the battery 110 by the charging station, and in the CV charging stage 220, the battery 110 is charged slowly because a relatively low current is supplied to the battery compared to the CC charging stage, by fixing the voltage.

Meanwhile, it has been illustrated that the battery is charged as much as 60% capacity with the CC charging method 210 and the remaining 40% capacity is charged with the CV charging method 220 in FIG. 2, but it is merely an exemplary embodiment, and the capacity of the battery charged with the CC charging method and the capacity of the battery charged with the CV charging method may be different according to the sort of the battery or a charger.

Meanwhile, if the battery 110 is charged according the CC charging method 210, the processor 120 may control the robot cleaner 100 to perform a cleaning operation for the remaining area using the charged battery 110.

That is, if the battery 110 is charged as much as a predetermined capacity, for example, 60% capacity as in the above exemplary embodiment, the processor 120 may cause the robot cleaner 100 to perform the cleaning operation for the remaining area using the battery 110 of 60% capacity.

Figure 3:
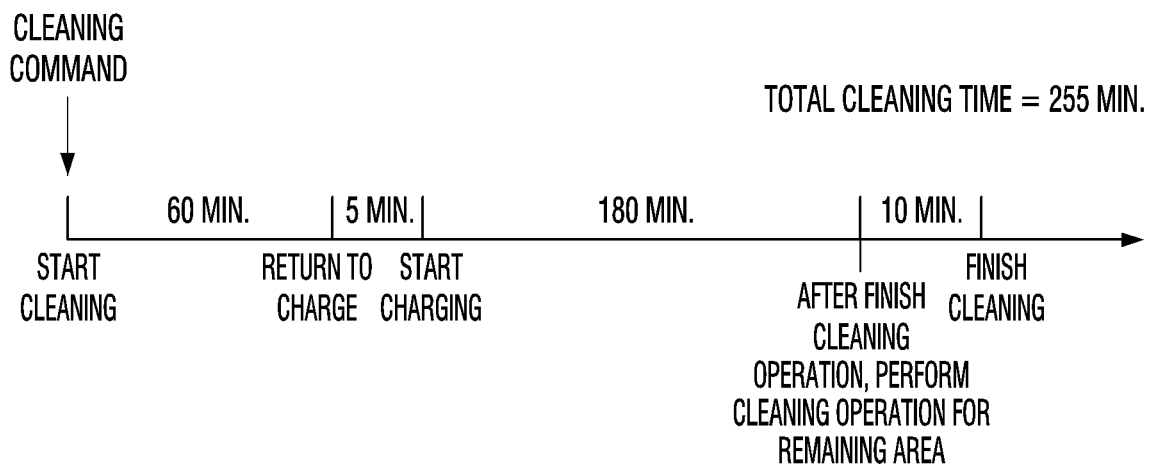
FIG. 3 is a view illustrating a method for charging some of a battery by using a battery charging method according to an exemplary embodiment.
Figure 3:
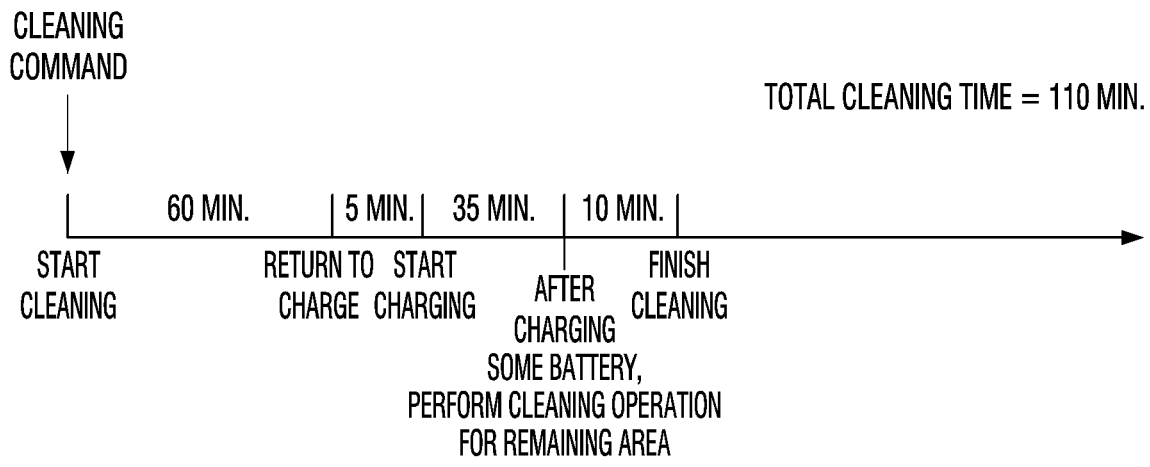
Figure 4:
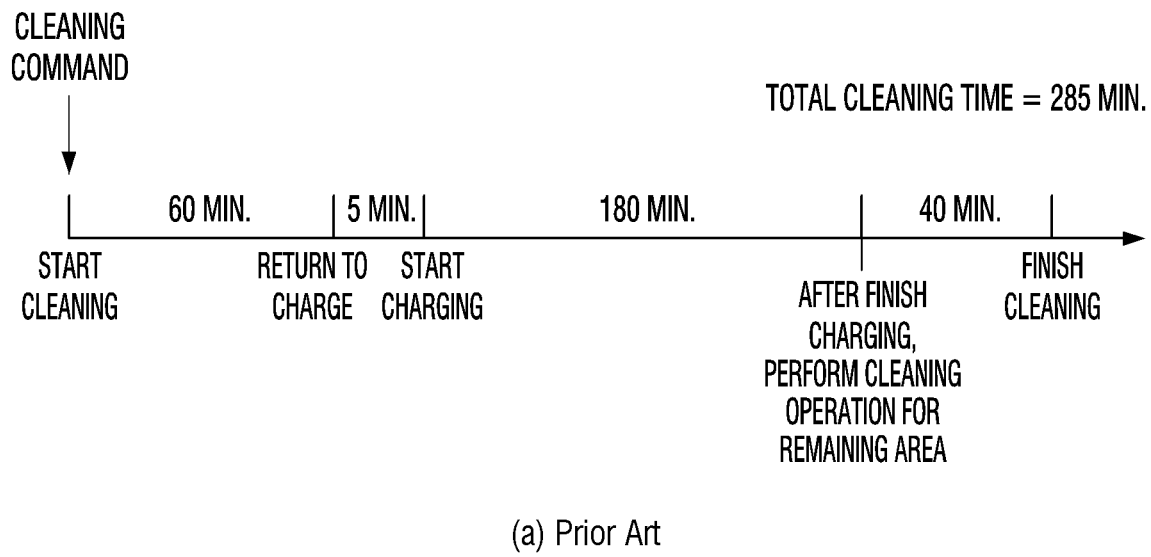
FIG. 4 is a view illustrating a method for charging some of a battery for two times by using a battery charging method according to an exemplary embodiment.
Figure 4:
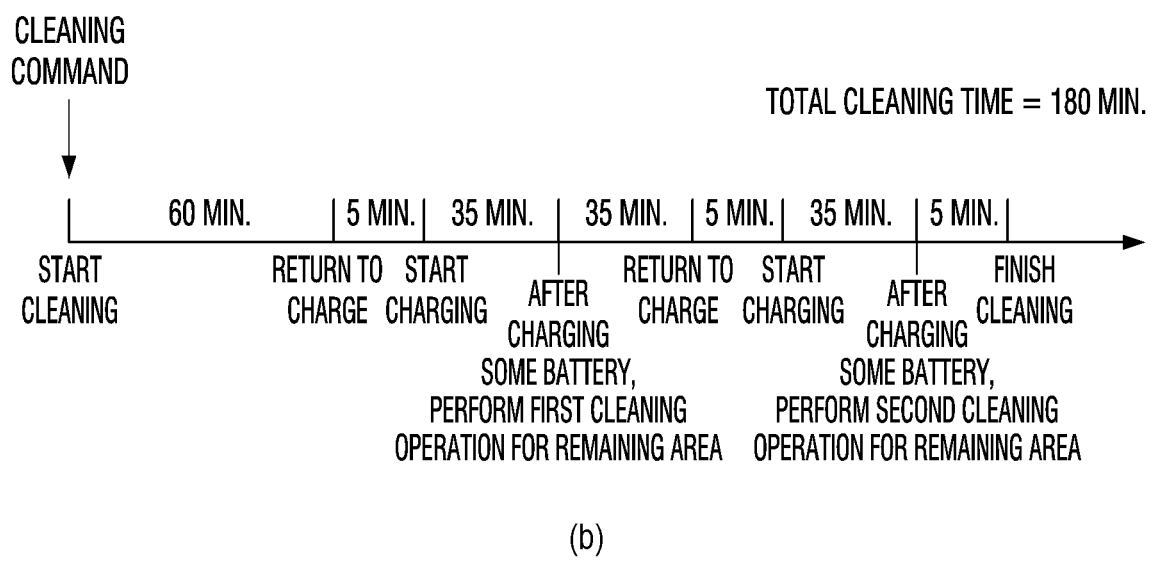

FIG. 3 is a view illustrating a method for charging some of a battery by using a battery charging method according to an exemplary embodiment.

Hereinafter an example will be described, the example in which the time consumed for fully charging the battery 110 is 180 minutes, the time in which the battery reaches the predetermined value according to a cleaning operation after fully charging the battery is 60 minutes after the cleaning operation starts, the time for charging the battery with the CC charging method is 35 minutes, the available time for cleaning after the battery is charged by the CC charging method is 35 minutes, the time for returning to the charging station for charging is 5 minutes, and the cleaning time is 70 minutes.

FIG. 3A is a view illustrating the process that the robot cleaner of a related art stops the cleaning operation and then charges the battery to finish the cleaning operation, and FIG. 3B is a view illustrating the process that the robot cleaner according to an exemplary embodiment stops the cleaning operation and then charges some of the battery to finish the cleaning operation.

As illustrated in FIG. 3A, the robot cleaner in the related art returns to the charging station and the battery of the robot cleaner is fully charged, if the battery reaches a predetermined value while performing the cleaning operation after the battery is fully charged. That is, if the battery reaches the predetermined value according to 60 minutes cleaning operation, the robot cleaner returns to the charging station and the battery thereof is fully charged for 180 minutes, and then performs the cleaning operation for a remaining area for 10 minutes to complete the cleaning operation.

On the other hand, as illustrated in FIG. 3B, if the battery 110 reaches a predetermined value due to the cleaning operation for 60 minutes, the robot cleaner 100 according to an exemplary embodiment 100 returns to the charging station and charges some of the battery 110 for 35 minutes through the CC charging method, and then performs the cleaning operation for a remaining area for 10 minutes to complete the cleaning operation.

That is, in the case of the robot cleaner of the related art, the total cleaning time is 255 minutes because the battery is fully charged and then the cleaning operation re-starts, but the robot cleaner 100 according to an exemplary embodiment may shorten the total cleaning time to 110 minutes because only some of the battery 110 is charged according to the CC charging method and then the cleaning operation re-starts.

Meanwhile, in this case, the example in which the total cleaning time is 70 minutes is provided, and thus, the robot cleaner 100 returns to the charging station for one time, but even in the case in which the robot cleaner 100 returns to the charging station for charging the battery more than one times, the total cleaning time can be shortened.

For example, FIG. 4A is a view illustrating the process that the robot cleaner in the related art stops a cleaning operation, and then charges a battery to complete the cleaning operation, and FIG. 4B is a view illustrating the process that the robot cleaner according to an exemplary embodiment stops for two times and then charges some of the battery to complete the cleaning operation.

Hereinafter the example in which the total cleaning time is 100 minutes will be provided.

As illustrated in FIG. 4A, in the case of the robot cleaner in the related art, if after the battery is fully charged, the battery reaches the predetermined value while performing a cleaning operation, the robot cleaner returns to the charging station and the battery is fully charged. That is, if the battery reaches the predetermined value due to the cleaning operation of 60 minutes, the robot cleaner returns to the charging station and the battery is fully charged for 180 minutes, and then, the robot cleaner performs the cleaning operation for a remaining area for 40 minutes and completes the cleaning operation.

On the other hand, as illustrated in FIG. 4B, in the case of the robot cleaner 100 according to an exemplary embodiment, if the battery 110 reaches the predetermined value due to the cleaning operation for 60 minutes, the robot cleaner 100 returns to the charging station and charges some of the battery 110 for 35 minutes through the CC charging method, and performs the cleaning operation for a remaining area for 35 minutes.

Here, if the battery 110 reaches the predetermined value again due to the cleaning operation for the remaining area for 35 minutes, the processor 120 may cause the robot cleaner 100 to return to the charging station and charge some of the battery 110 for 35 minutes through the CC charging method, and then perform the cleaning operation for a remaining area for 5 minutes to complete the cleaning operation.

That is, in the case of the robot cleaner of the related art, the total cleaning time is 285 minutes because the battery thereof is fully charged, but in the case of the robot cleaner 100 according to an exemplary embodiment, the total cleaning time may be shorten to 180 minutes because even the robot cleaner returns to the charging station for two times, only some of the battery 110 is charged through the CC charging method.

Meanwhile, it has been described that the processor 120 charges some of the battery 110 as much as the capacity determined according to the charging method of the battery 110, but the processor 120 may charge some of the battery 110 as much as the predetermined capacity.

Here, the predetermined capacity may be set by a manufacturer in advance, or set and changed by a user. For example, a manufacturer or a user may set the battery 110 to be charged as much as 50% capacity of total capacity, if the remaining capacity of the battery 110 reaches the predetermined value.

In this case, referring to FIG. 2, the processor 120 may charge the battery 110 for 30 minutes so as to be charged up to 50% of the total capacity. Here, if it is assumed that the cleaning available time after 50% of the capacity is charged is 30 minutes, the robot cleaner 100 may perform the cleaning operation for 60 minutes using the battery 110 which is fully charged, after starting the cleaning operation, and move to the charging station for 5 minutes, charge 50% of the battery 110 for 30 minutes, and then perform a cleaning operation for a remaining area for 30 minutes.

In addition, if the battery 110 reaches a predetermined value again due to the cleaning operation for the remaining area for 30 minutes, the processor 120 may move the robot cleaner 100 to return to the charging station to charge 50% of the battery 110, and complete the cleaning operation by performing the cleaning operation for a remaining area for 5 minutes.

That is, if the battery 110 is charged as much as the predetermined capacity by a manufacturer or a user, the total cleaning time may be 165 minutes, and thus, there is an effect that the total cleaning time is shortened compared to the robot cleaner of the related art of which total cleaning time is 285 minutes.

Meanwhile, it has been described that the predetermined capacity is 50% f total capacity in an exemplary embodiment, but it may be different according to the value set by a manufacturer or a user.

In addition, it has been described in an exemplary embodiment that the battery is charged through the CCCV charging method, but the battery charged with other methods can control the robot cleaner 100 by being set the capacity to be charged in advance, as in the above described method.

Hereinafter the method for charging a battery as much as a certain capacity based on the information on the cleaning area, and the method for performing a cleaning operation for a remaining area will be described referring to FIGS. 5 and 6.

Figure 5:
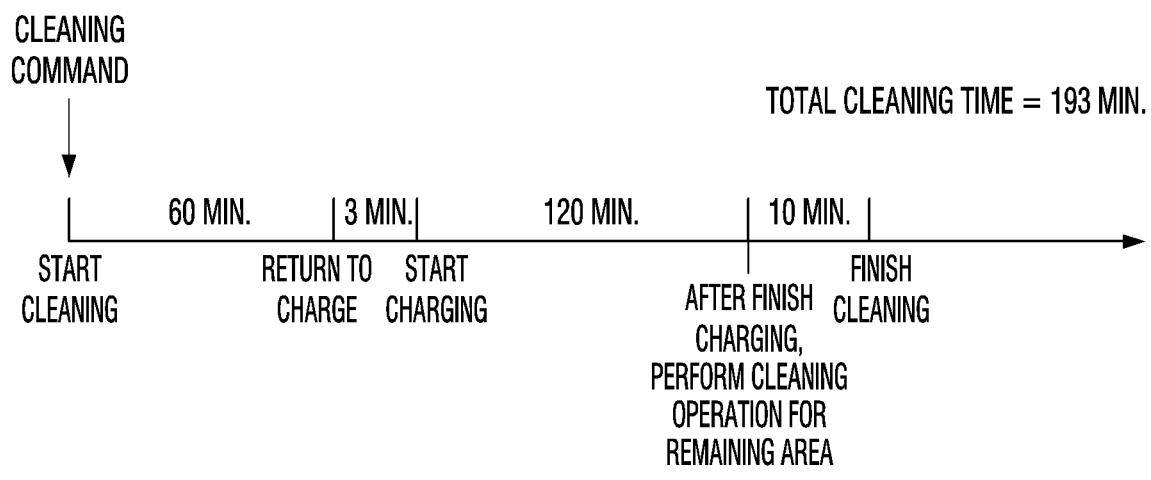
FIG. 5 is a view illustrating a method for charging some of a battery by using information on a cleaning area according to an exemplary embodiment.
Figure 5:
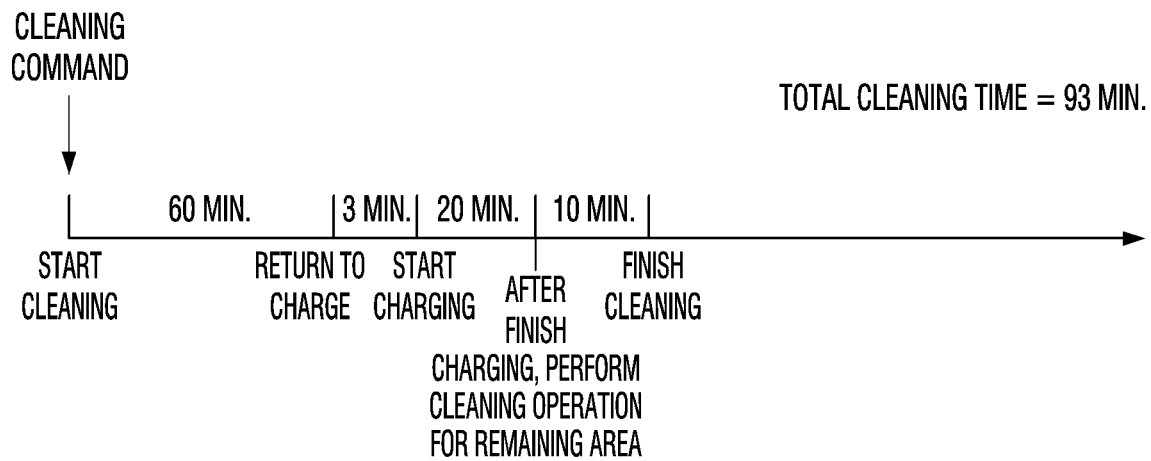

FIG. 5 is a view illustrating a method for charging some of a battery by using information on a cleaning area according to an exemplary embodiment.

Here, the information on the cleaning area may include the cleaning map which indicates the cleaning area to be cleaned by the robot cleaner 100, and the cleaning map may include the size and shape of the area to be cleaned by the robot cleaner 100.

For this, as described in the above, the robot cleaner 100 may pre-store the cleaning map which indicates the cleaning area, and if the robot cleaner 100 does not include the cleaning map, the cleaning map may be generated according to the moving trajectory of the robot cleaner 100 using a preset algorithm.

In addition, if the remaining capacity of the battery 110 reaches a predetermined value, the processor 120 may calculate the time consumed to clean the remaining area where the cleaning operation is not performed, based on the cleaning map.

Specifically, the processor 120 may determine the size and the form of the remaining area based on the cleaning map, and calculate the time consumed for cleaning the remaining area by determining the driving speed of the robot cleaner 100 based on the movement of the robot cleaner 100.

Here, the driving speed of the robot cleaner 100 may be the speed when the cleaning is started or restarted after stopping. Here, the processor 120 may calculate the time consumed for a cleaning operation by applying the speed when the robot cleaner 100 starts a cleaning operation or restarts a cleaning operation after stopping, and applying the size and the form of the remaining area to be cleaned, to the preset algorithm.

For this, the robot cleaner 100 may further include a sensor for measuring speed (not illustrated) such as an acceleration sensor and a gyro sensor for measuring the movement and the driving speed.

Meanwhile, the time consumed for cleaning the remaining area may be different according to the size and the shape of the remaining area. Especially, even if the size of the remaining area is the same, if the shape of the remaining area is different, the time consumed for a cleaning operation may be different.

For example, even if some cleaning areas have the same size, if the shape of an area is square, the robot cleaner 100 may reach a wall for fewer times while driving, than the case in which the shape of an area is in the form of '⊓' or '∟', and accordingly, the robot cleaner which cleans the square area may change the driving direction for fewer times than the robot cleaner which cleans the area in the form of '⊓' or '∟', and thus the processor 120 may calculate shorter cleaning time.

As such, in that the processor 120 may calculate the time consumed for cleaning the remaining area considering the shape of the area in addition to the driving speed, the size of the area to be cleaned, more accurate time required for a cleaning operation can be calculated.

Subsequently, the processor 120 may calculate the battery 110 capacity to perform a cleaning operation for the time consumed for the cleaning operation which is calculated, and charge the battery 110 as much as the calculated capacity. For example, if the robot cleaner 100 charges the battery with the CCCV method as illustrated in FIG. 2, if the calculated battery 110 capacity is 60%, the processor 120 may control to charge for about 35 minutes.

Hereinafter the example will be provided in which the time for fully charge the battery 110 is 2 hours, the time for the battery to reach the predetermined value due to a cleaning operation after the battery is fully charged is 60 minutes after starting the cleaning operation, the charging time required to perform a cleaning operation for 10 minutes is 20 minutes, the time consumed for returning to a charging station to perform a charging is 3 minutes, and the time converted from the size of the area to be cleaned is 70 minutes.

FIG. 5A is a view illustrating the process that the robot cleaner in the related art charges a battery after stopping the cleaning operation and completes the cleaning operation, and FIG. 5B is a view illustrating the process that the robot cleaner according to an exemplary embodiment charges some of the battery based on the cleaning map after stopping the cleaning operation and completes the cleaning operation.

As illustrated in FIG. 5A, in the case of the robot cleaner in the related art, if the battery reaches a predetermined value while performing a cleaning operation after the battery is fully charged, the robot cleaner returns to the charging station and the battery is fully charged. That is, if the battery becomes a predetermined value due to the cleaning operation of 60 minutes, the robot cleaner returns to the charging station and the battery is fully charged for 120 minutes, and then the robot cleaner performs a cleaning operation for a remaining area for 10 minutes to complete the cleaning operation.

On the other hand, as illustrated in FIG. 5B, in the case of the robot cleaner 100 according to an exemplary embodiment, if the battery 110 reaches the predetermined value due to the cleaning operation of 60 minutes, the robot cleaner 100 returns to the charging station and charges some of the battery 110. Here, the robot cleaner 100 determines the remaining area where the cleaning operation is not performed based on the cleaning map, calculates the time which will be consumed for cleaning the determined remaining area and charges the battery 110.

In an exemplary embodiment, the processor 120 may calculate the time consumed for cleaning the determined remaining area as 10 minutes, and perform the battery charging for 20 minutes to charge the battery as much as the capacity required for performing the additional cleaning for 10 minutes. Subsequently, the robot cleaner may perform the cleaning operation for 10 minutes for the remaining area and complete the cleaning operation.

That is, in the case of the robot cleaner in the related art, the battery is fully charged, and thus, the total cleaning time is 193 minutes. However, in the case of the robot cleaner 100 according to an exemplary embodiment, the total cleaning time may be shortened to 93 minutes by charging only some of the battery as much as the capacity required to perform a cleaning operation for the remaining area.

Meanwhile, it has been described that the time consumed for cleaning the remaining area is calculated based on the cleaning map, but the information on the cleaning area may be provided by a user.

For example, the robot cleaner 100 may receive a plane figure of an interior area where the cleaning operation will be performed, from an external apparatus (not illustrated), or may receive through an interface (not illustrated) such as a USB port etc. included in the robot cleaner 100. Here, the plane figure may be divided into a plurality of spaces, and include location information and size information of each area. Accordingly, the processor 120 may calculate the time consumed for cleaning the remaining area based on the plane figure.

Meanwhile, it has been described that the time consumed for cleaning the remaining area is calculated based on the time consumed for performing the cleaning operation, but the processor 120 may calculate the battery capacity based on the suction mode of the robot cleaner.

Specifically, the processor 120 may determine the suction mode which indicates the suction intensity of the robot cleaner 100 when performing a cleaning operation, and calculate the battery capacity required for cleaning the remaining area based on the determined suction mode and the time consumed for the cleaning operation for the remaining area.

Here, the suction mode may be divided according to the suction intensity. For example, the operation mode of the suction mode may be divided into 1~5 according to the suction intensity, and the higher suction intensity may require the larger power for performing a cleaning operation.

Accordingly, if the robot cleaner 100 is set to operate in a relatively strong suction mode, the processor 120 may calculate the large battery capacity required to be charged because the required power is high even if the cleaning operation is performed for the same interior space for the same time. On the other hand, if the robot cleaner 100 is set to operate in a relatively low suction mode, the processor 120 may calculate the small battery capacity required to be charged.

It has been described that the battery 110 is charged as much as the capacity required to complete the cleaning operation for the remaining area, but the processor 120 may further charge the battery 110 as much as the capacity required to return to the charging station from the point where the cleaning operation for a remaining area is completed.

That is, if the remaining capacity reaches the predetermined value and the battery 110 is charged in the charging station, the processor 120 may determine the cleaning completion point based on the cleaning map, calculate the moving distance from the point where the cleaning operation is completed to the charging station, and additionally charge the capacity required for returning to the charging station. For this, the robot cleaner 100 may pre-store the location information of the charging station.

In addition, it has been described that if the remaining capacity of the battery 110 reaches a predetermined value, the cleaning operation is performed after some of the battery 110 is charged, but the processor 120 may control to perform the cleaning operation for the remaining area without charging the battery 110.

Specifically, if it is determined that although the remaining capacity of the battery 110 reaches the predetermined value, the predetermined capacity value exceeds the battery capacity required to perform the cleaning operation for the remaining area, the processor 120 may control to perform the cleaning operation for the remaining area without charging the battery 110. Accordingly, the cleaning completion time may be shortened without consuming the time to return to the charging station or to charge.

In addition, it has been described that the cleaning operation is stopped and the battery is charged, but the robot cleaner 100 according to an exemplary embodiment may charge the battery as much as the required capacity before starting the cleaning operation. Hereinafter this will be described with reference to FIG. 6.

Figure 6:
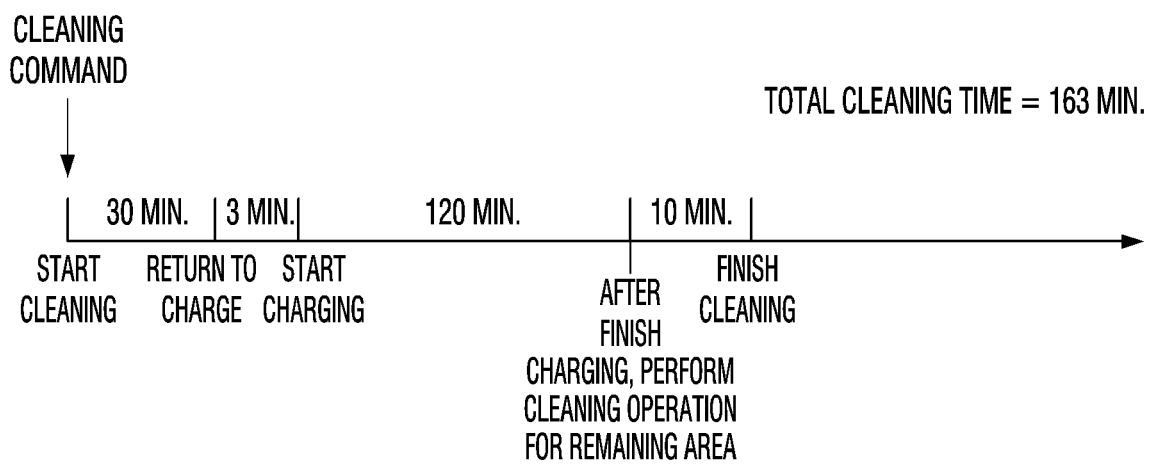
FIG. 6 is a view illustrating a method for charging some of a battery before performing a cleaning operation according to an exemplary embodiment.
Figure 6:

FIG. 6 is a view illustrating a method for charging some of a battery before performing a cleaning operation according to an exemplary embodiment.

The example will be provided in which the time for fully charging the battery 110 is 2 hours, the charging time required to perform a cleaning operation for 10 minutes is 20 minutes, the time for performing the cleaning operation according to the current battery capacity is 30 minutes, the time consumed for returning to a charging station to perform a charging is 3 minutes, and the time converted from the size of the area to be cleaned is 70 minutes.

FIG. 6A is a view illustrating the process in which the robot cleaner stops the cleaning operation, and then charges the battery to complete the cleaning operation, and FIG. 6B is a view illustrating the process in which the robot cleaner according to an exemplary embodiment charges some of the battery before starting the cleaning and completes the cleaning operation.

As illustrated in FIG. 6A, the robot cleaner of the related art performs a cleaning operation if a cleaning command is input, and while performing the cleaning operation, if the battery reaches the predetermined value, returns to the charging station and the battery is fully charged. That is, the robot cleaner performs the cleaning operation for 30 minutes according to the current battery capacity, and thereafter, if the battery reaches a predetermined value, the robot cleaner returns to the charging station and the battery is fully charged for 120 minutes, and then complete the cleaning operation by cleaning the remaining area for 10 minutes.

On the other hand, as illustrated in FIG. 6B, the robot cleaner 100 according to an exemplary embodiment may calculate the battery capacity required to complete the cleaning operation for the cleaning area based on the cleaning map before performing the cleaning operation. In an exemplary embodiment, because the time consumed for performing the cleaning operation is 30 minutes according to the current battery capacity, the processor 120 may firstly perform a charging for 20 minutes for performing the cleaning operation for 40 minutes.

That is, in the case of the robot cleaner in the related art, the cleaning completion time is 163 minutes because the battery is charged if the battery reaches the predetermined value, but in the case of the robot cleaner 100 according to an exemplary embodiment, the cleaning completion time can be shortened to 60 minutes because the battery 110 is charged as much as the capacity required for performing the cleaning operation before performing the cleaning operation.

Figure 7:
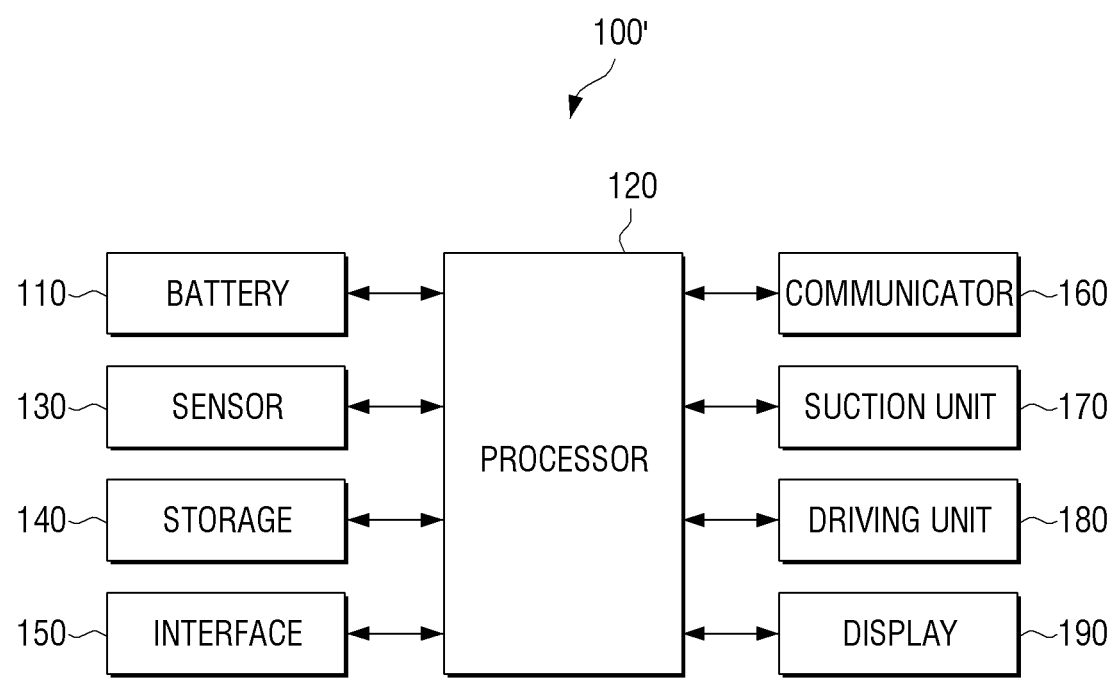
FIG. 7 is a detailed block diagram illustrating a robot cleaner according to an exemplary embodiment.

FIG. 7 is a detailed block diagram illustrating a robot cleaner according to an exemplary embodiment.

As illustrated in FIG. 7, the robot cleaner 100 may include the battery 110, the processor 120, a sensor 130, a storage 140, an interface 150, a communicator 160, a suction unit 170, a driving unit 180 and a display 190. Hereinafter the description overlapped with those described above will be omitted.

The sensor 130 may sense the obstacle surrounding the robot cleaner 100. In detail, the sensor 130 may sense the position of the obstacle and the distance from the obstacle surrounding the robot cleaner 100 using a supersonic sensor, an infrared sensor, a RF sensor, and the like. In addition, the sensor 130 may further include a clash sensor which senses an obstacle through a clash with the obstacle.

In addition, the sensor 130 may sense an object located in the front of the robot cleaner. Specifically, the sensor 130 includes a photographing unit which may photograph the front of the robot cleaner 100, and may detect an object through an image process in the image captured by the photographing unit. In addition, with regard to the object required to be sucked or detoured, the sensor 130 may store the corresponding captured image in the storage 140.

In addition, the sensor 130 may sense a dust degree on a floor surface. Specifically, the sensor 130 may include a dust sensor which senses the dust degree of the air input to the suction unit 170. Through this, the sensor 130 may determine that the cleaning has been well-performed if the amount of the dust sensed in real time reduces to a predetermined amount.

In addition, the sensor 130 may sense whether the robot cleaner 100 contacts a liquid. Specifically, the sensor 130 may sense whether the wheel consisting of the driving unit 180 of the robot cleaner 100 contacts a liquid.

The storage 140 may store various programs and data required for an operation of the robot cleaner 100. The storage 140 may be implemented to be non-volatile memory, volatile memory, flash memory, hard disk drive (HDD) or solid state drive (SSD).

In addition, the storage 140 may store a capacity value of the battery 110 to be charged if the remaining capacity of the battery 110 reaches a predetermined value. Here, the capacity value of the battery 110 to be charged may be set by a manufacturer in advance, and set or changed by a user.

In addition, the storage 140 may store the map information generated according to the driving operation of the driving unit 180, that is, the cleaning map. Here, the cleaning map is the information which indicates a moving rout of the robot cleaner in the cleaning process, and it may be in a form of an image, or trajectory data in a form of a coordinate.

In addition, the storage 140 may store a plane figure of an interior space through the communicator 160. Here, the plane figure includes location information and size information of each space when the plane figure is divided into a plurality of spaces.

The storage 140 may store the history etc. occurs in the cleaning process as history information. Here, the history information may include cleaning time, information on the number of charging, information on the number of occurrence of an error, error information, information on the area where a cleaning is not performed, and the like.

The interface 150 may include a plurality of numbers of function keys in which a user may set or select various functions provided by the robot cleaner 100. The interface 150 may be implemented as an apparatus such as a plurality of buttons, and as a touch screen in which the function of the display 190 can be performed at the same time.

The interface 150 may receive an on/off command of a cleaning function of the robot cleaner 100, a selection of a cleaning mode, a re-cleaning command for the area where a cleaning operation is not performed, a cleaning command on a specific space, and the like.

The communicator 160 may be formed to connect the robot cleaner 100 to an external apparatus (e.g., a terminal apparatus) and connected according to the wireless communication method (e.g., Bluetooth, Wi-Fi, Wi-Fi direct).

In addition, the communicator 160 may receive the information on the cleaning area from the communicator 160. Here, the information on the space may be an image file such as a plane figure of an interior space. This information may include the information regarding the space divided by a user in the total space in which the robot cleaner can be moved, or the space divided by a structure (e.g., a living room, a kitchen, and a main room etc.), and may include the location information and the size information of each space.

In addition, the communicator 160 may receive a cleaning command. The cleaning command may be the cleaning command with regard to a total area, and may be the cleaning command with regard to a specific area.

The communicator 160 may transmit cleaning result information. Specifically, the communicator 160 may transmit the cleaning result information to an external apparatus at the point when the cleaning is completed. Here, the cleaning result information may include a cleaning rout of the robot cleaner and in addition to the cleaning rout, may further include the map information, error information, the information on the area where the cleaning operation is not performed which are generated in the robot cleaner.

The suction unit 170 may suck the dust at the floor surface of the robot cleaner 100. Specifically, the suction unit 170 may suck the foreign material at the lower part while moving or stopping in a cleaning operation. The suction unit 170 may further include an air cleaning unit which cleans contaminants in the air.

The suction unit 170 may have a plurality of operation modes. Here, the operation mode may be divided according to the suction intensity. A user may set any one operation mode in advance and may be changed according to a weather. For example, the operation mode is divided into 1~5 according to the suction intensity, and if the user set 3 as a default, if there is a yellow dust or fine dust warning, the suction unit 170 may operate in 4 or 5 operation mode which has a stronger suction intensity than the default value.

The driving unit 180 may move the robot cleaner. The driving unit 180 may be connected to one or more than one wheels and includes a driving unit such as a motor. In addition, the driving unit 180 may perform a driving operation, such as moving, stopping, changing direction and the like, according to the control signal.

The display 190 may display all kinds of information supported by the robot cleaner 100. The display 190 may be a monitor in a small size such as an LCD, or may be implemented as a touch screen which can perform the above described function of the interface 150 at the same time.

The display 190 may display the information such as an operation state of the robot cleaner 100 (whether it is in a cleaning mode or a sleeping mode), the information related to performing the cleaning operation (e.g., a cleaning time, a current cleaning mode (e.g., a suction intensity)), battery information, whether the battery is charged, whether the dust box is full of dust, an error state (a liquid contact state) and the like. If an error is detected, the display 190 may display the detected error.

The processor 120 may control each element in the robot cleaner 100.

For example, the processor 120 may control hardware or software components connected to the processor 120 by driving the operating system or an application program, and process or compute various data. Further, the processor 120 may load and process a command or data received from at least one of the other components to a volatile memory and store diverse data in a non-volatile memory.

For this operation, the processor 120 may be realized in a generic-purpose processor (for example, a CPU or an application processor) for performing the corresponding operations by running one or more software programs stored in a memory device or an exclusive processor (e.g., an embedded processor) for performing the corresponding operations.

First, the processor 120 may start the cleaning operation according to the user command. In addition, if it is determined that the battery 110 is requited to be charged due to the lack of capacity while performing the cleaning operation, some of the battery 110 is charged based on the charging method of the battery or some of the battery 110 is charged by calculating the battery capacity required for cleaning the remaining area.

Here, in the case of the CCCV charging method, the method for charging the battery based on the battery charging method is charging the battery as much as the predetermined capacity according to the CC charging method, and the method for charging some of the battery by calculating the battery capacity required for cleaning the remaining area is the method based on the cleaning map, as described above.

Figure 8:
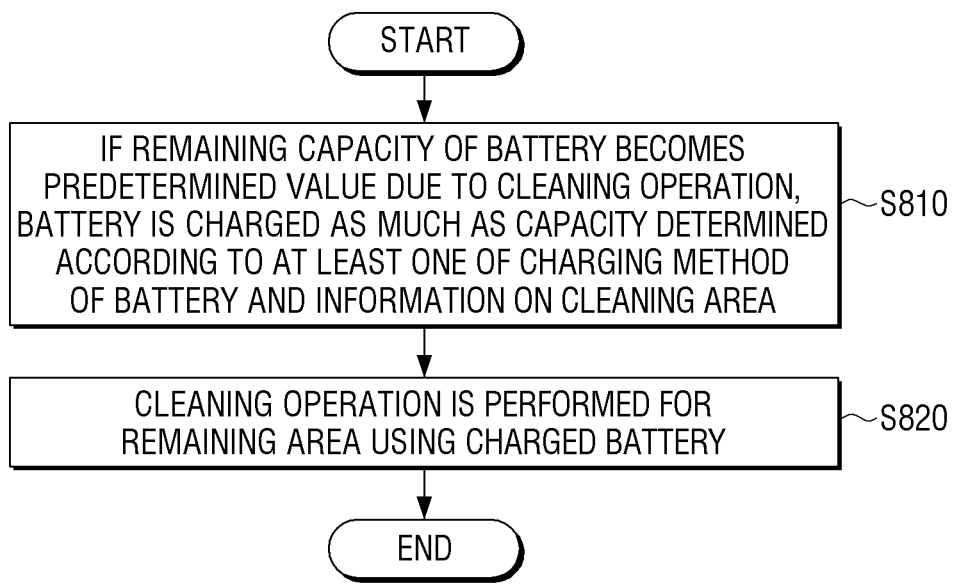
FIG. 8 is a view illustrating a method for controlling a robot cleaner according to an exemplary embodiment.

FIG. 8 is a view illustrating a method for controlling a robot cleaner according to an exemplary embodiment.

First, if the remaining capacity of the battery becomes a predetermined value due to the cleaning operation, the robot cleaner may charge the battery as much as the capacity determined according to at least one of the charging method of the battery and the information on the cleaning area in S810. Here, the battery charging method may be the CCCV charging method, and the information on the cleaning area may be the cleaning map, as described above.

In addition, the robot cleaner performs a cleaning operation for the remaining area using the charged battery in S820. Accordingly, different from the robot cleaner of the related art which completely charges the battery and then restart the cleaning operation when the battery is low while performing the cleaning operation, the robot cleaner according to an exemplary embodiment charges only some of the battery and restarts the cleaning operation, and thus the time from the start to the end of the cleaning can be shortened.

The above-described method for controlling the robot cleaner according to an example embodiment may be implemented as a program for execution on a computer and stored in a computer-readable recording medium. Examples of the computer readable recording medium include a ROM, a RAM, a CD-ROM, a magnetic tape, a floppy disk, an optical data storage device, and the like, and may also be implemented in the form of a carrier wave (for example, transmission over the Internet).

The recording medium readable by a computer may be distributed in computer systems that are connected over a network so that a code readable by a computer may be stored and executed in a dispersion method. Functional programs, code and code segments for implementing the above method can be easily inferred by programmers of the art to which the present disclosure pertains.

Although various example embodiments have been illustrated and described, it will be appreciated by those skilled in the art that changes may be made to these example embodiments without departing from the principles and spirit of the present disclosure. Accordingly, the scope of the present disclosure is not limited to the described example embodiments, but is defined by the appended claims as well as equivalents thereto.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A robot cleaner that performs a cleaning operation in a cleaning area, the robot cleaner comprising:
 a battery; and
 a processor configured to:
  based on a capacity of the battery reaching a predetermined value as the robot cleaner performs the cleaning operation in a first area of the cleaning area, control the robot cleaner to charge a capacity of the battery, wherein a charging method of the battery is a Constant Current Constant Voltage (CCCV) charging method in which:
   a predetermined capacity is quickly charged through a Constant current (CC) charging method as a first charging method, and
   a remaining capacity is charged through a Constant voltage (CV) charging method as a second charging method;
  clean a second area of the cleaning area using the charged capacity of the battery, wherein a predetermined capacity of the battery is charged through the first charging method and the remaining capacity of the battery is charged through the second charging method;
in response to information on the cleaning area being stored in the robot cleaner:
calculate a battery capacity required to clean the second area based on the information on the cleaning area and a driving speed of the robot cleaner;
control the robot cleaner to charge the capacity of the battery through at least one of the first and second charging methods based on the calculated battery capacity;
in response to information on the cleaning area not being stored in the robot cleaner:
control the robot cleaner to charge the capacity of the battery through the first charging method, which charges the battery faster than the second charging method, up to the predetermined capacity regardless of the battery capacity required to clean the second area;
in response to the battery being charged as much as the predetermined capacity only according to the first charging method, control the robot cleaner to clean the second area of the cleaning area using the charged capacity of the battery, wherein the remaining capacity of the battery is not charged in response to information on the cleaning area not being stored in the robot cleaner; and
in response to the capacity of the battery reaching the predetermined value,
control to charge some of the battery as much as a capacity determined according to at least one of a charging method of the battery and information on a cleaning area, wherein the information on the cleaning area includes a cleaning map which indicates the cleaning area;
calculate a first time consumed for cleaning the second area where a cleaning operation is not performed in the cleaning area based on the cleaning map;
determine a size and a form of the second area based on the cleaning map; and
calculate a second time consumed for cleaning the second area based on the size and the form of the second area.

2. The robot cleaner as claimed in claim 1, wherein the processor, in response to the capacity of the battery reaching the predetermined value, is further configured to control to charge some of the battery as much as a preset capacity.

3. The robot cleaner as claimed in claim 1, wherein:
the processor, in response to the capacity of the battery reaching the predetermined value, is further configured to:
calculate a battery capacity required to clean the second area for the first calculated time,
charge the battery as much as the calculated battery capacity, and
clean the second area using the charged battery.

4. The robot cleaner as claimed in claim 3, wherein the processor is further configured to:
determine a suction mode which indicates a suction intensity of the robot cleaner when a cleaning is performed, and
calculate a battery capacity required to clean the second area for the first calculated time in the determined suction mode.

5. The robot cleaner as claimed in claim 1, wherein the processor is further configured to:
calculate a battery capacity required to finish cleaning before performing the cleaning operation for the cleaning area, and
in response to a current battery capacity being lower than the calculated battery capacity, control to perform cleaning after charging the battery as much as the calculated battery capacity.

6. The robot cleaner as claimed in claim 1, wherein the processor is further configured to additionally charge a capacity required for returning to a charging station from a point in which a cleaning operation for the second area is finished.

7. The robot cleaner as claimed in claim 1, wherein the processor, in response to the remaining capacity of the battery reaching the predetermined value and it being determined that the remaining capacity exceeds a battery capacity required to clean the second area, is further configured to perform a cleaning operation for the second area without charging the battery.

8. A method for controlling a robot cleaner that performs a cleaning operation in a cleaning area, the method comprising:
based on a capacity of a battery reaching a predetermined value as the robot cleaner performs the cleaning operation in a first area of the cleaning area, charging a capacity of the battery; and
cleaning a second area of the cleaning area using the charged capacity of the battery;
wherein a charging method of the battery is a CCCV charging method in which a predetermined capacity is quickly charged through a CC charging method as a first charging method, and a remaining capacity is charged through a CV charging method as a second charging method,
wherein a predetermined capacity of the battery is charged through the first charging method and the remaining capacity of the battery is charged through the second charging method,
wherein charging comprises:
in response to information on the cleaning area being stored in the robot cleaner:
calculating a battery capacity required to clean the second area based on the information on the cleaning area and a driving speed of the robot cleaner; and
charging the capacity of the battery through at least one of the first and second charging methods based on the calculated battery capacity; and
in response to information on the cleaning area not being stored in the robot cleaner:
charging the capacity of the battery through the first charging method, which charges the capacity of the battery faster than the second charging method, up to the predetermined capacity regardless of the battery capacity required to clean the second area; and
cleaning the second area comprises using the charged battery in response to the battery being charged as much as the predetermined capacity according to the first charging method,
wherein the remaining capacity of the battery is not charged in response to information on the cleaning area not being stored in the robot cleaner,
wherein charging the battery comprises charging some of the battery as much as a capacity determined according to at least one of a charging method of the battery and information on a cleaning area, in response to the remaining capacity of the battery reaching the predetermined value, wherein the information on the cleaning area comprises a cleaning map which indicates the cleaning area, wherein the calculating a battery capacity comprises calculating a time consumed for cleaning the second area where a cleaning operation is not performed in the cleaning area based on the cleaning map;

wherein calculating the time consumed for cleaning the second area comprises:

determining a size and a form of the second area based on the cleaning map; and calculating a time consumed for cleaning the second area based on the size and the form of the second area.

9. The method as claimed in claim 8, wherein charging the battery comprises charging some of the battery as much as a preset capacity in response to the capacity of the battery reaching the predetermined value.

10. The method as claimed in claim 8, wherein:

charging the battery in response to the capacity of the battery reaching the predetermined value, comprises calculating a battery capacity required to clean the second area for the calculated time; and charging the battery as much as the calculated battery capacity.

11. The method as claimed in claim 10, wherein calculating a battery capacity required to clean the second area comprises:

determining a suction mode which indicates a suction intensity of the robot cleaner when a cleaning is performed; and calculating a battery capacity required to clean the second area for a predetermined time in the determined suction mode.

12. The method as claimed in claim 8, further comprising:

calculating a battery capacity required to finish the cleaning before performing the cleaning operation for the cleaning area; and in response to a current battery capacity being lower than the calculated battery capacity, performing the cleaning after charging the battery as much as the calculated battery capacity.

13. The method as claimed in claim 8, wherein charging the battery comprises additionally charging a capacity required for returning to a charging station from a point in which a cleaning operation for the second area is finished.

14. The method as claimed in claim 8, wherein charging the battery comprises, in response to the remaining capacity of the battery reaching the predetermined value and it being determined that the remaining capacity exceeds a battery capacity required to clean the second area, performing a cleaning operation for the second area without charging the battery.

* * * * *